United States Patent
Yoshino

(10) Patent No.: US 9,791,123 B2
(45) Date of Patent: Oct. 17, 2017

(54) VEHICLE SIGNAL LAMP

(71) Applicant: Stanley Electric Co., Ltd., Tokyo (JP)

(72) Inventor: Morihisa Yoshino, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 89 days.

(21) Appl. No.: 15/000,694

(22) Filed: Jan. 19, 2016

(65) Prior Publication Data
US 2016/0208995 A1 Jul. 21, 2016

(30) Foreign Application Priority Data

Jan. 21, 2015 (JP) .................................. 2015-009145

(51) Int. Cl.
| | |
|---|---|
| *B60Q 1/30* | (2006.01) |
| *F21S 8/10* | (2006.01) |
| *B60Q 1/00* | (2006.01) |
| *B60Q 1/26* | (2006.01) |

(52) U.S. Cl.
CPC ........ *F21S 48/2212* (2013.01); *B60Q 1/0041* (2013.01); *B60Q 1/2607* (2013.01); *F21S 48/215* (2013.01); *F21S 48/2243* (2013.01)

(58) Field of Classification Search
CPC ...... F21S 48/22; F21S 48/2212; F21S 48/234; B60Q 1/0041; B60Q 1/2601; B60Q 1/30
See application file for complete search history.

(56) References Cited

U.S. PATENT DOCUMENTS

| | | | | |
|---|---|---|---|---|
| 2013/0265791 | A1* | 10/2013 | Dassanayake | F21S 48/215 362/520 |
| 2013/0314935 | A1* | 11/2013 | Tokieda | G02B 6/0001 362/511 |
| 2013/0329445 | A1* | 12/2013 | Oh | B60Q 1/0041 362/543 |
| 2014/0160739 | A1* | 6/2014 | Hiesl | F21V 15/01 362/217.1 |
| 2014/0160777 | A1* | 6/2014 | Mugge | F21S 48/00 362/508 |
| 2014/0254186 | A1* | 9/2014 | Terai | G02B 6/0095 362/487 |

(Continued)

FOREIGN PATENT DOCUMENTS

| | | |
|---|---|---|
| JP | 2012-123977 A | 6/2012 |
| JP | 2014-123547 A | 7/2014 |

*Primary Examiner* — Julie Bannan
(74) *Attorney, Agent, or Firm* — Kenealy Vaidya LLP

(57) ABSTRACT

A vehicle signal lamp can include a first lamp unit, a second lamp unit and a boundary between the first and second lamp units so as to be attached continuously to vehicles including a trunk lid. Each of at least one first light source, at least one second light source and a boundary light source can be located in the first lamp unit including a first outer lens and the second lamp unit including a second outer lens, respectively. Each of the first light source and the second light source can emit light from the first outer lens and the second outer lens, respectively, and also the boundary light source can illuminate the boundary by using the second outer lens. Thus, the vehicle signal lamps with a simple structure can be used for various signal lamps, and which can provide a favorable light distribution as one continuous favorable light-emitting pattern.

20 Claims, 10 Drawing Sheets

(56) References Cited

U.S. PATENT DOCUMENTS

| | | | |
|---|---|---|---|
| 2015/0323149 A1* | 11/2015 | Salter | B60Q 1/26 |
| | | | 362/510 |
| 2016/0061397 A1* | 3/2016 | Ito | F21S 48/1163 |
| | | | 362/520 |
| 2016/0103269 A1* | 4/2016 | Narita | G02B 6/002 |
| | | | 362/617 |
| 2016/0207446 A1* | 7/2016 | Kumegawa | B60Q 1/0035 |
| 2016/0245475 A1* | 8/2016 | Dubosc | B60Q 1/0035 |

* cited by examiner

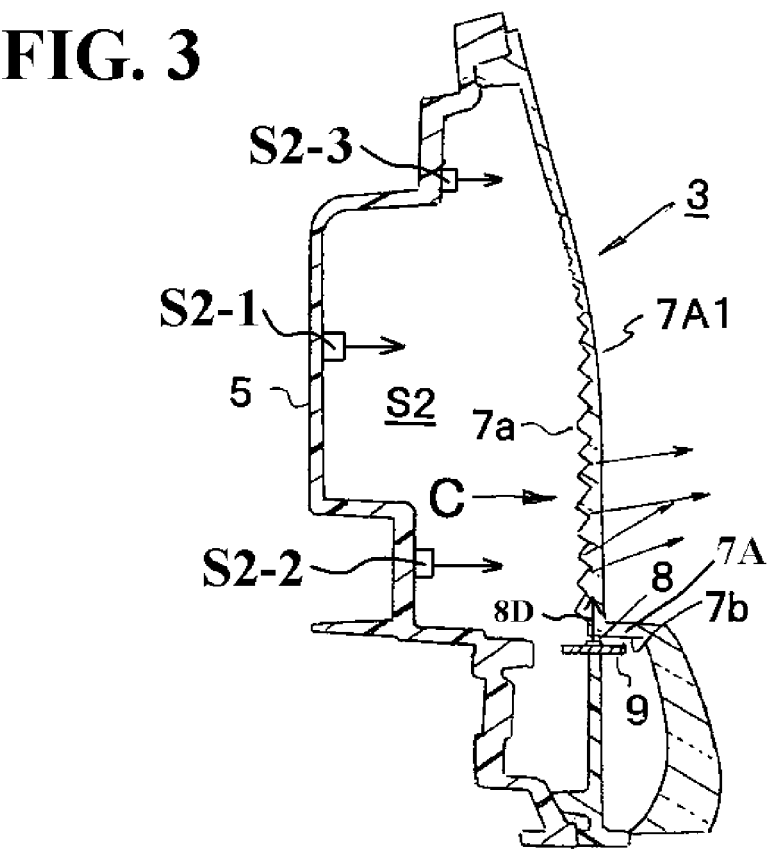

VEHICLE SIGNAL LAMP

This application claims the priority benefit under 35 U.S.C. §119 of Japanese Patent Application No. 2015-009145 filed on Jan. 21, 2015, which is hereby incorporated in its entirety by reference.

BACKGROUND

1. Field

The presently disclosed subject matter relates to vehicle signal lamps attached continuously to an openable and closable trunk lid and a part of a vehicle body, which is located adjacent the trunk lid, and more particularly relates to the vehicle signal lamps with a simple structure, which can emits light having a favorable light-intensity even from a space between the openable and closable trunk lid and the part of the vehicle body located adjacent the trunk lid.

2. Description of the Related Art

Vehicle signal lamps such as a tail lamp, a stop lamp, a turn signal lamp and the like are required to be attached to a rear right and left of vehicles so that drivers moving vehicles from a rearward direction of the vehicles can recognize driving conditions such as moving in a frontward direction of the vehicles, going to turn left, going to decrease speeds of the vehicles, etc. Such a conventional rear signal lamp is disclosed in Patent document No. 1 (Japanese Patent Application Laid Open JP2012-123977).

FIG. 9a is a schematic rear view depicting a vehicle incorporating a first conventional rear signal lamp, and FIG. 9b is a schematic front view including a partial transparent view depicting the first conventional rear signal lamp to be incorporated into a rear right of the vehicle shown in FIG. 9a, which is disclosed in Patent document No. 1. The vehicle 20 includes: a vehicular body 21; an openable and closable trunk lid 22 attached to the vehicle body 21, the trunk lid 22 including a trunk knob 23 to open or close the trunk lid; and each of the rear signal lamp 30R and 30L be symmetrically attached to a rear right and left of the vehicle 20, respectively.

The rear signal lamp 30R, which is attached to the rear right of the vehicle 20, includes a first rear lamp 31A, a second rear lamp 31B and a boundary 39 located between the first rear lamp 31A and the second rear lamp 31B, as shown in FIG. 9b when the trunk lid 22 closes. When the trunk lid 22 opens, each of the first rear lamp 31A and the second rear lamp 31B may separate with respect to each other from the boundary 39, because the trunk lid 22 moves in an upward direction of the vehicle body 21.

The first rear signal lamp 31A includes: a first casing 32A; a first front lens 35A attached to the first casing 32A, extending toward the boundary 39 and bending in an inward direction of the boundary 39; a plurality of first light guides 33A located in the first casing 32A, extending toward the boundary 39 along the first front lens 35A; and a plurality of first light-emitting diodes (LEDs) 34A each located at a respective one end of the first light guides 33A located in an opposite direction of the boundary 39 so as to emit light toward the second rear signal lamp 31B via the respective one of the light guides 33A.

The second rear signal lamp 31B includes: a second casing 32B; a second front lens 35B attached to the second casing 32B, extending toward the boundary 39 and bending in an inward direction of the boundary 39; a plurality of second light guides 33B located in the second casing 32B, extending toward the boundary 39 along the second front lens 35B; and a plurality of second LEDs 34B each located at a respective one end of the first light guides 33B located in an opposite direction of the boundary 39 so as to emit light toward the first rear signal lamp 31A via the respective one of the second light guides 33B.

Hence, the first conventional rear signal lamp 30R may illuminate the boundary 39 by using the lights emitted from the first LEDs 34A via the respective one of the first light guides 33A and by using the lights emitted from the second LEDs 34B via the respective one of the second light guides 33B. Similarly, the first conventional rear signal lamp 30L, which is attached to the rear left of the vehicle 20, may also illuminate a left boundary caused between a first rear signal lamp and a second rear signal lamp of the rear signal lamp 30L.

However, the above-described first conventional lamp 30R needs the first plurality of light guides 33A and the second plurality of light guides 33B to illuminate the boundary 39, which coordinates with various signal lamps such as a tail lamp, a stop lamp, etc. Such a structure including the light guides may be subject to a complex configuration. Consequently, a second conventional rear signal lamp, which includes two light guides formed in a planar shape, is disclosed in Patent document No. 2 (Japanese Patent Application Laid Open JP2014-123547).

FIG. 10a is a schematic front view depicting a second conventional rear signal lamp, and FIG. 10b is a schematic partial cross-sectional top view of Circle C shown in FIG. 10a depicting the second conventional rear signal lamp, which is disclosed in Patent document No. 2. The second conventional rear signal lamp 40 includes a first rear lamp 41A, a second rear lamp 41B and a boundary 49 located between the first rear lamp 41A and the second rear lamp 41B, as shown in FIG. 10b.

The first rear lamp 41A includes: a first casing 42A; a first front lens 43A attached to the first casing 42A, extending toward the boundary 49 and bending in an inward direction of the boundary 49; a first inner cover 44A formed in a planar shape, located between the first casing 42A and the first front lens 43A, and a longitudinal direction thereof extending toward the boundary 39 along the front lens 43A; a first light guide plate 46A having a first guide end and a second guide end formed in a planar shape, located between the first casing 42A and the inner cover 44A, a longitudinal direction thereof the extending toward the boundary 49 along the first front lens 43A, and the first guide end facing said bending portion of the first front lens 43A; a first light source 45A facing the second guide end of the first light guide plate 46A so that light emitted from the first light source 45A may be emitted toward the first front lens 43A via the first inner cover 44A by reflecting a part of the light on a rear surface of the first light guide plate 46A and also may be emitted toward the bending portion of the first front lens 43A by reflecting another part of the light on a front surface of the first light guide plate 46A.

The second rear lamp 41B includes: a second casing 42B; a second front lens 43B attached to the second casing 42B, extending toward the boundary 49 and bending in an inward direction of the boundary 49; a second inner cover 44B formed in a substantially planar shape, located between the first casing 42B and the second front lens 43B, and bending along the boundary 49, and a longitudinal direction thereof extending toward the boundary 39 along the second front lens 43B; a second light guide plate 46B having a second guide end 46BE formed in a substantially planar shape, located between the second casing 42B and the second inner cover 44B, a longitudinal direction of the second light guide plate 46B extending toward the boundary 39 along the second front lens 43B, and the second guide end 46BE facing said bending portion of the second front lens 43B via the bending portion of the second inner cover 44B; a second light source 45B facing another second guide end of the second light guide plate 46B located in an opposite direction of the second guide end 46BE so that light emitted from the second light source 45B may be emitted toward the second front lens 43B via the second inner cover 44B by reflecting a part of the light on a rear surface of the second light guide plate 46B and also may be emitted toward the bending portion of the second front lens 43B via the second inner cover 44B by reflecting another part of the light on a front surface of the second light guide plate 46B.

Hence, the second conventional rear signal lamp 40 may emit lights from the first front lens 43A and the second front lens 43B in rearward directions of vehicles incorporating the rear signal lamp 40, and also may emit lights from the bending portion of the first and the second front lenses 43A and 43B toward the boundary 49. Additionally, Patent document 2 discloses that light emitted from a third light source 45C attached to the second casing 42B may also be emitted toward at least the boundary 49 by reflecting the light on the rear surface of the second light guide plate 46B, as shown in FIG. 10b.

Accordingly, the second conventional rear signal lamp 40 may also illuminate the boundary 49 located between the first signal lamp 41A and the second signal lamp 41B by using each of the two light guide plates 46A and 47A of the first signal lamp 41A and the second signal lamp 41B. However, each of the first light guide plate 46A and the second light guide plate 46B needs to reflect each of the lights toward the first inner cover 44A and the second inner cover 44B while reflecting each of parts of the lights toward the boundary 49 by using the rear surface and the front surface thereof, respectively. Therefore, the second conventional rear signal lamp 40 may also be subject to a complex structure, and also it may become difficult for the conventional rear signal lamp 40 to control the lights by using each of the first light guide plate 46A and the second light guide plate 46B in order to provide a favorable light distribution in accordance with each of kinds of the vehicles.

The above-referenced Patent Documents are listed below, and are hereby incorporated with their English abstracts in their entireties.
1. Patent Document No. 1: Japanese Patent Application Laid Open JP2012-123977
2. Patent Document No. 2: Japanese Patent Application Laid Open JP2014-123547

The disclosed subject matter has been devised to consider the above and other problems, features, and characteristics. Thus, embodiments of the disclosed subject matter can include vehicle signal lamps with a simple structure, which is attached continuously to an openable and closable trunk lid and a part of a vehicle body located adjacent the trunk lid, and which can illuminate even a space caused by a boundary between the trunk lid and the part of the vehicle body. Therefore, the disclosed subject matter can provide the vehicle signal lamps that can be used for a tail lamp, a stop lamp, a turn signal lamp and the like, which are attached to a rear right and left of vehicles, and which do not cause and/or are designed to prevent some of the above-described problems, concerns, and characteristics related to a lighting of the boundary.

SUMMARY

The presently disclosed subject matter has been devised in view of the above and other problems, features, and characteristics. An aspect of the disclosed subject matter includes vehicle signal lamps with a simple structure, which can be used for various signal lamps such as a tail lamp and the like, and which can provide a favorable light distribution even from the boundary in addition to two light-emitting surfaces as one continuous favorable light-emitting pattern by using a light-emitting surface connecting to one of the two light-emitting surfaces.

According to an aspect of the disclosed subject matter, a vehicle signal lamp can include: a boundary; a first lamp unit including a first casing and a first outer lens, the first outer lens attached to the first casing and covering a first opening of the first casing, and thereby a first lamp room formed between the first casing and the first outer lens, and a first inner portion of the first outer lens extending in a direction toward the first casing from the first outer lens along the boundary; at least one first light source located in the first lamp room, and a first light-emitting direction of the first light source being directed toward the first outer lens of the first lamp unit; and a second lamp unit including a first casing and a second outer lens, the second outer lens attached to the second casing and covering a second opening of the second casing, and thereby a second lamp room formed between the second casing and the second outer lens, and a second inner portion of the second outer lens extending in a direction toward the second casing from the second outer lens along the boundary, and therefore facing the first inner portion of the first outer lens via the boundary, which is located between the first lamp unit and the second lamp unit, the second inner portion of the second outer lens including a second inner end surface, a second outer surface and a second inner surface located in an opposite direction of the second outer surface, and substantially facing the boundary, the second inner surface of the second inner portion including a plurality of concavo-convex surfaces, which extends in a substantially horizontal direction of the vehicle signal lamp.

In addition, the vehicle signal lamp can also include: a boundary light source facing the second inner end surface of the second outer lens, and a boundary light-emitting direction of the boundary light source being directed toward the second inner end surface of the second outer lens; and at least one second light source located in the second lamp room, and a second light-emitting direction of the second light source being directed toward the second outer lens of the second lamp unit.

In the above-described exemplary vehicle signal lamp, the signal lamp can further include a second incident surface connecting to each of the second outer surface and the second inner surface of the second outer lens located in an opposite direction of the second inner end surface of the second outer lens, and a second boundary light source facing the second incident surface, and a second optical axis of the second boundary light source intersecting with the incident surface at a substantially right angle, and also can further include a first incident surface connecting to the second inner end surface of the second inner portion, being located toward the second casing, facing the boundary light source, and be directed toward the boundary light-emitting direction of the boundary light source. Additionally, the signal lamp can further include a first shade be attached to the second casing, and a second shade attached to the casing, wherein each of the first shade and the second shade surrounds the boundary light source, and also can further include at least one of a reflective layer and a refusing layer formed on the plurality of concavo-convex surfaces of the second inner surface.

In the above-described exemplary vehicle signal lamps, the at least one first light source can be used as a light source for at least one of a tail lamp and a stop lamp, and the at least one second light source can also used as a light source for at least one of a tail lamp and a stop lamp. Additionally, at least one of the at least one first light source, the boundary light source and the at least one second light source can be a light-emitting diode.

According to the above-described exemplary vehicle signal lamps, the boundary light source can illuminate the boundary located between the first outer lens and the second outer lens by using the second outer lens and the like in addition to each of the first light source located in the first lamp room and the second light source located in the second lamp room. Thus, the disclosed subject matter can provide vehicle signal lamps with a simple structure, which can be used for various signal lamps such as a tail lamp and the like, and which can provide a favorable light distribution even from the boundary in addition to two light-emitting surfaces as one continuous favorable light-emitting pattern by using a light-emitting surface connecting to one of the two light-emitting surfaces.

BRIEF DESCRIPTION OF THE DRAWINGS

These and other characteristics and features of the disclosed subject matter will become clear from the following description with reference to the accompanying drawings, wherein:

FIG. 3 is a partial cross-sectional side view taken along Line B-B shown in FIG. 1 showing the vehicle signal lamp;

FIG. 9b is a schematic front view including a partial transparent view depicting the first conventional rear signal lamp to be incorporated into a rear right of the vehicle shown in FIG. 9a.

DETAILED DESCRIPTION OF EXEMPLARY EMBODIMENTS

Figure 1:
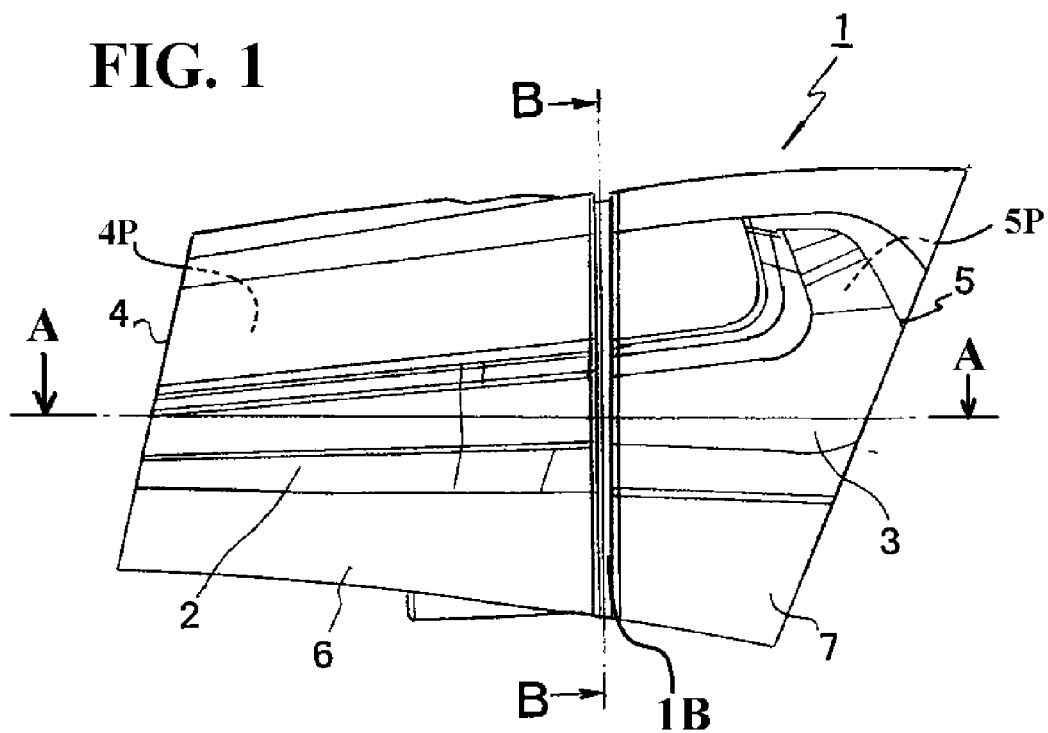
FIG. 1 is a front view showing an exemplary embodiment of a vehicle signal lamp made in accordance with principles of the disclosed subject matter.

Exemplary embodiments of the disclosed subject matter will now be described in detail with reference to FIG. 1 to FIG. 8. FIG. 1 is a front view showing an exemplary embodiment of a vehicle signal lamp device made in accordance with principles of the disclosed subject matter. The vehicle signal lamp 1 can be incorporated into a rear right of a vehicle in common with the first conventional rear signal lamp as shown in FIG. 9a and FIG. 9b. A vehicle signal lamp incorporated into a rear left of the vehicle can be substantially symmetrical to the vehicle signal lamp 1. Accordingly, the vehicle signal lamp 1 will now be described in detail with reference to FIG. 1 to FIG. 8.

The vehicle signal lamp 1 can include a first lamp unit 2, which is attached to an openable and closable trunk lid of a vehicle, a second lamp unit 3, which is attached to a vehicle body of the vehicle located adjacent the trunk lid of the vehicle, and can also be employed as a rear combination lamp of the vehicle. Therefore, when the truck lid opens, each of the first lamp unit 2 and the second lamp unit 3 can separate with respect to each other from a boundary 1B, which is located between the first lamp unit 2 and the second lamp unit 3. When the truck lid closes, the boundary 1B can be located between the first lamp unit 2 and the second lamp unit 3.

Figure 2:
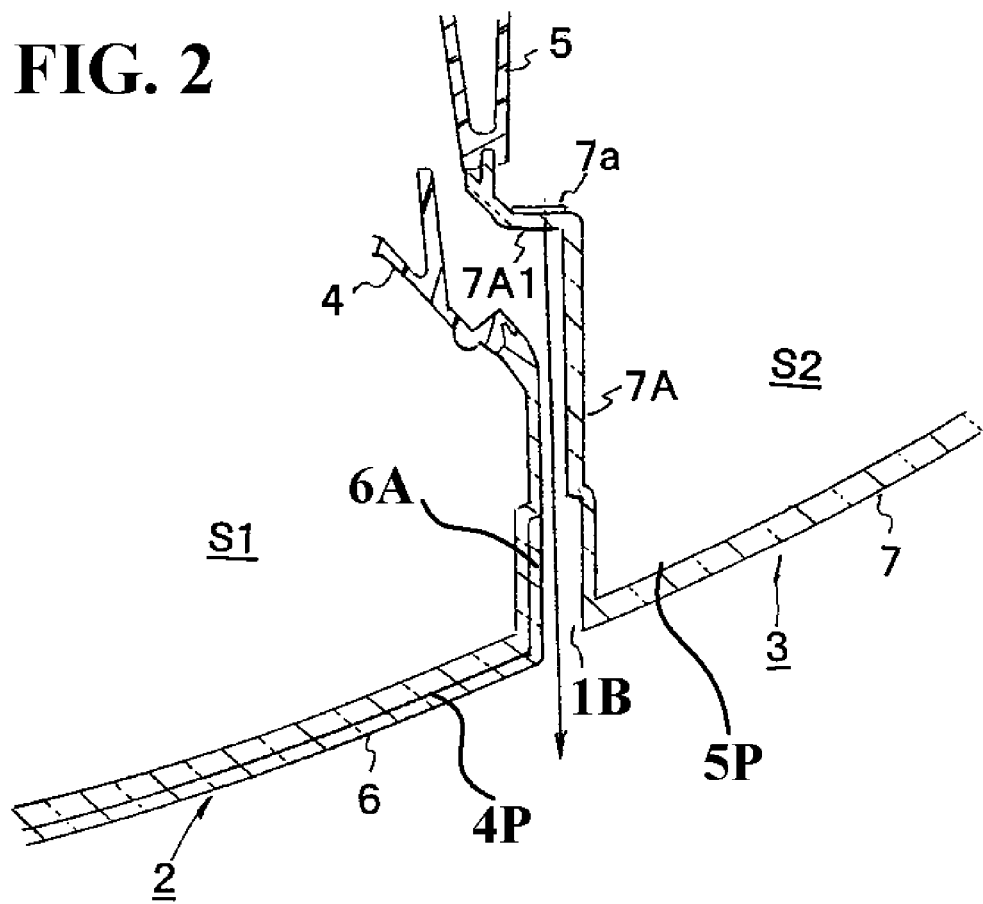
FIG. 2 is a partial cross-sectional top view taken along Line A-A shown in FIG. 1 showing the vehicle signal lamp.

The first lamp unit 2 can include a first casing 4 having a first opening 4P and a first outer lens 6 attached to the first casing 4 and covering the first opening 4P, and also the second lamp unit 3 can include a second casing 5 having a second opening 5P and a second outer lens 7 attached to the second casing 5 and covering the second opening 5P. FIG. 2 is a partial cross-sectional top view taken along Line A-A shown in FIG. 1 showing the vehicle signal lamp 1, and FIG. 3 is a partial cross-sectional side view taken along Line B-B shown in FIG. 1 showing the vehicle signal lamp 1.

Each of the first casing 4 and the second casing 5 can include the first opening 4P and the second opening 5P, respectively. Each of the first outer lens 6 and the second outer lens 7 can be made from a transparent material such as an acrylic resin, which may pass though light, and can cover the first opening 4P of the first casing 4 and the second opening 5P of the second casing 5, respectively. Accordingly, each of the first lamp unit 2 and the second lamp unit 3 can include a first lamp room S1 and a second lamp room S2, which are surrounded by each of the first casing 4 and the first outer lens 6 and by each of the second casing 5 and the second outer lens 7, respectively.

The first outer lens 6 of the first lamp unit 2 can include a first inner portion 6A, which extends along the boundary 1B in a direction toward the first casing 4 from the first outer lens 6 located in a rearward direction of the vehicle. The second outer lens 7 of the second lamp unit 3 can also include a second inner portion 7A, which extends long the boundary 1B in a direction toward the second casing 5 from the second outer lens 7 located in the rearward direction of the vehicle.

Therefore, the second inner portion 7A of the second outer lens 7 can substantially face the first inner portion 6A via the boundary 1B. The second inner portion 7A of the second outer lens 7 can include a second outer surface 7A1, which is formed in a substantially planar shape and which extends in a direction toward the first lamp room S1 at a substantially right angle with reference to the second inner portion 7A, and can include a second inner surface 7a, which is located in an opposite direction of the second outer surface 7A1, as shown in FIG. 2.

In addition, as shown in FIG. 3, the second inner surface 7a can include a plurality of concavo-convex surfaces, which extends in a substantially horizontal direction of the vehicle signal lamp 1 and which aligns in a substantially vertical direction of the vehicle signal lamp 1, when the vehicle signal lamp 1 is incorporated into the vehicle. On the plurality of concavo-convex surfaces of the second inner surface 7a, a reflecting layer such as an aluminum layer and/or a refusing layer such as refusing dots can be formed to improve a light-emitting efficiency.

The second inner portion 7A of the second outer lens 7 can include a second inner end surface 7b, which connects to the second inner surface 7a and is used as an incident surface for the second inner surface 7a in addition to the second outer surface 7A1. The second inner end surface 7b of the second inner portion 7A can face a boundary light source 8 such as a light-emitting diode (LED), a bulb and the like, which is mounted on a circuit board 9, and therefore can revive light emitted from the boundary light source 8 to be entered between the second outer surface 7A1 and the second inner surface 7a.

Figure 4A:
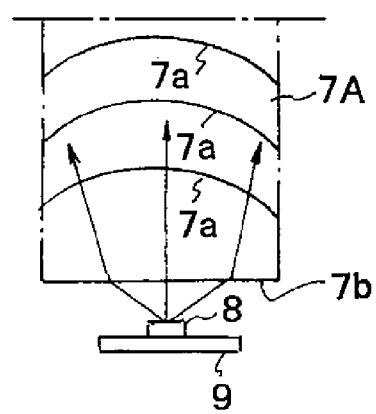
FIGS. 4a and 4b are explanatory views from Direction C shown in FIG. 3 depicting each of lights emitted from inner light sources in accordance with each of shapes of the inner end surfaces used as an incident surface shown in FIG. 3, respectively.
Figure 4B:
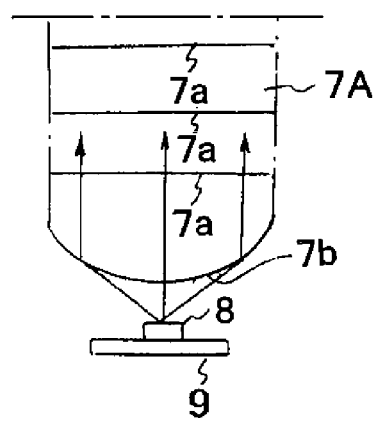

In this case, the light emitted from the boundary light source 8 can be reflected by the second inner surface 7a including the plurality of concavo-convex surfaces, and can illuminate the boundary 1B via the second outer surface 7A1 of the second inner portion 7A, which substantially faces the boundary 1B as shown in FIG. 2. Additionally, when the light emitted from the boundary light source 8 is observed from Direction C shown in FIG. 3, the light emitted from the boundary light source 8 differs according to a shape of the inner end surfaces 7b used as the incident surface as shown in FIGS. 4a and 4b.

Accordingly, each of the concavo-convex surfaces of the second inner surface 7a cannot be limited to a linear shape. Each of the concavo-convex surfaces of the second inner surface 7a can be formed in various shapes, provided the concavo-convex surfaces extend in the substantially horizontal direction of the vehicle signal lamp 1, when the vehicle signal lamp 1 is incorporated into the vehicle.

When the vehicle signal lamp 1 is used for a rear combination signal lamp, each of second light sources S2-1, S2-2 and S2-3 such as the LED, the bulb and the like can be attached to the second casing 5 in the second lamp room S2 so that each of light-emitting directions S2-1D of the second light sources S2-1, S2-2 and S2-3 can be directed toward the second outer lens 7, respectively, as shown in FIG. 3. Similarly, each of first light sources S1-1, S1-2 and S1-3 such as the LED, the bulb and the like can be attached to the first casing 4 in the first lamp room S1 so that each of light-emitting directions of the first light sources S1-1, S-2 and S1-3 can be directed toward the first outer lens 6, respectively.

Figure 4C:
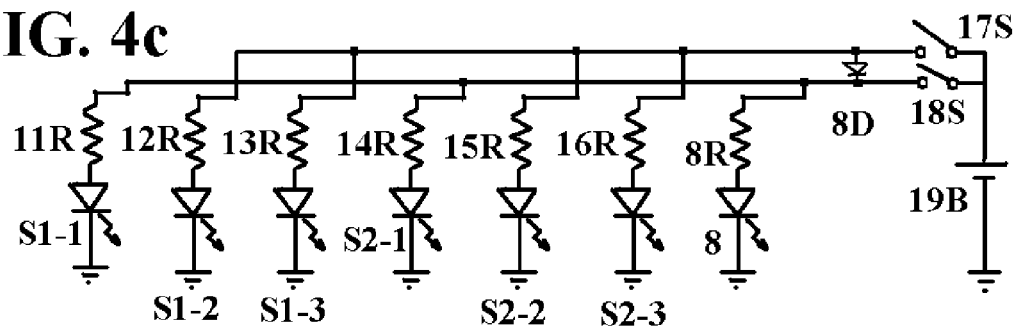
FIG. 4c is an exemplary circuit diagram for the vehicle signal lamp of FIG. 1.
Figure 5:
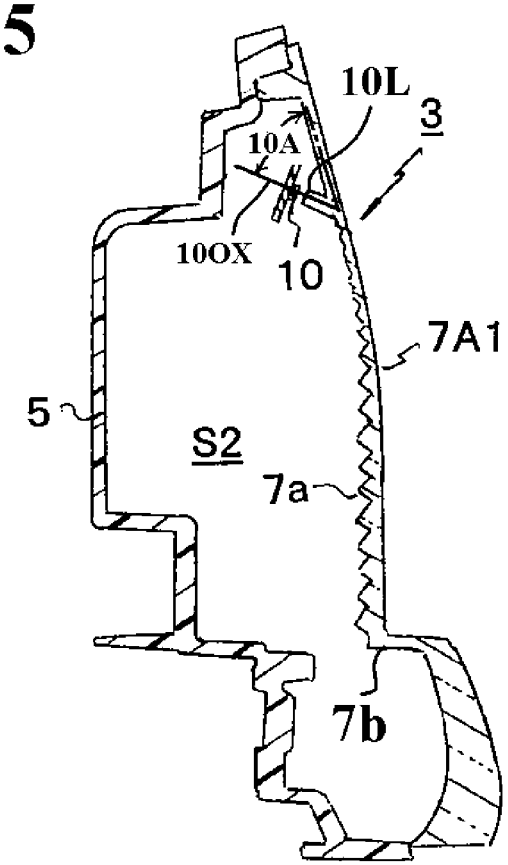
FIG. 5 is a partial cross-sectional side view taken along Line B-B shown in FIG. 1 showing a first exemplary variation of the vehicle signal lamp of FIG. 1.

As shown in FIG. 4c in which the LED is used as each of the light sources, when the rear combination signal lamp of the vehicle signal lamp 1 is used for a tail lamp showing a vehicle width indicator at night, each of the first light source S1-1 located in the first lamp room S1, the second light source S2-1 and the boundary light source 8 located in the second lamp room S2 can emit red lights in the rearward direction of the vehicle incorporating the vehicle signal lamp 1 via the first outer lens 6, the second outer lens 7 and the second outer surface 7A1 of the second inner portion 7A by turning on a tail lamp switch 18S connecting to a battery 19B used as a power source.

In this case, the boundary light source 8 can illuminate the boundary 1B located between the first outer lens 6 and the second outer lens 7 in addition to each of the first light source S1-1 located in the first lamp room S1 and the second light source S2-1 located in the second lamp room S2. Therefore, the red lights emitted in the rearward direction of the vehicle incorporating the vehicle signal lamp 1 from the first outer lens 6, the second outer lens 7 and the second outer surface 7A1 of the second inner portion 7A can be observed as one continuous favorable light-emitting pattern by drivers moving from the rearward direction of the vehicle toward the vehicle with confidence.

When the rear combination signal lamp of the vehicle signal lamp 1 is used for a stop lamp, which indicates going to stop the vehicle incorporating the vehicle signal lamp 1, each of the first light sources S1-1, S1-2 and S1-3 located in the first lamp room S1, the second light sources S2-1, S-2 and S2-3 and the boundary light source 8 located in the second lamp room S2 can emit red lights in the rearward direction of the vehicle via the first outer lens 6, the second outer lens 7 and the second outer surface 7A1 of the second inner portion 7A by turning on a stop lamp switch 17S connecting to the battery 19B.

In this case also, the boundary light source 8 can illuminate the boundary 1B located between the first outer lens 6 and the second outer lens 7 in addition to each of the first light sources S1-1, S1-2 and S1-3 located in the first lamp room S1 and the second light sources S2-1, S2-2 and S2-3 located in the second lamp room S2. Accordingly, the red lights having a higher light-intensity than the tail lamp emitted in the rearward direction of the vehicle incorporating the vehicle signal lamp 1 from the first outer lens 6, the second outer lens 7 and the second outer surface 7A1 of the second inner portion 7A can be observed as one continuous favorable light-emitting pattern by drivers moving from the rearward direction of the vehicle toward the vehicle with confidence.

When the vehicle signal lamp 1 emits the red lights, a red LED can be used as each of the light sources. If a white LED or the bulb is used as each of the light sources, each of the first outer lens 6 and the second outer lens 7 including the second inner portion 7A can be composed of a red transparent resin. Each of resistances 11R, 12R, 13R, 14R, 15R, 16R and 8R can adjust each light-intensity of the light sources connecting to the resistances by varying each current of the light sources, respectively. Additionally, a diode 8D can be used not to emit the stop lamp when the tail lamp switch 18S turns on.

Next, exemplary variations of the vehicle signal lamp 1 will now be described with reference to FIG. 5 to FIG. 8. A first exemplary variation relates to a location of the boundary light source 8 as shown FIG. 5. The vehicle signal lamp 1 can include the boundary light source 8 facing the second inner end surface 7b of the second inner portion 7A as shown in FIG. 3. The first variation of the vehicle signal lamp 1 can include a second boundary light source 10 having a second optical axis 10OX, which is located in an opposite direction of the boundary light source 8 and which faces a second incident surface 10L connecting to each of the second outer surface 7A1 and the second inner surface 7a of the second outer lens 7 so that the second optical axis 10OX intersects with the incident surface 10L at a substantially right angle. An incident angle 10A of the second boundary light source 10 can be less than 90 degrees with reference to the second outer surface 7A1 of the second inner portion 7A.

Figure 6:
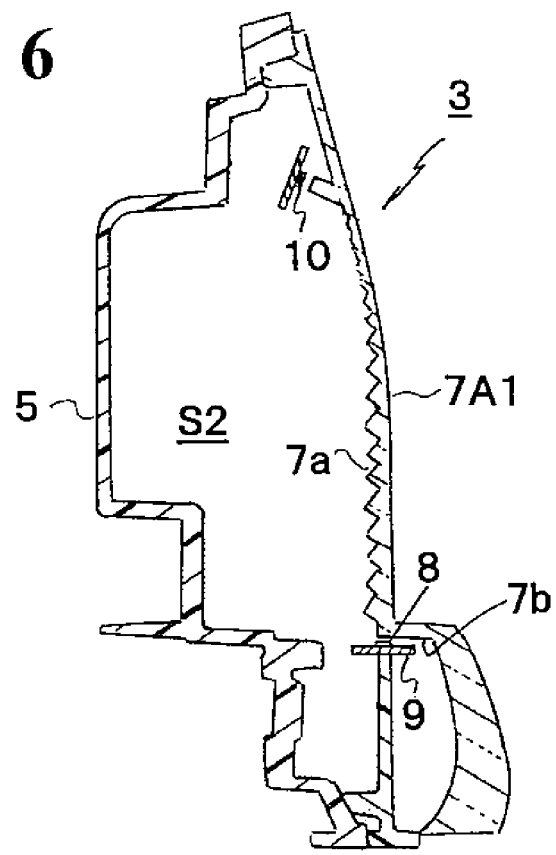
FIG. 6 is a partial cross-sectional side view taken along Line B-B shown in FIG. 1 showing a second exemplary variation of the vehicle signal lamp of FIG. 1.

In addition, both the boundary light source 8 facing the second inner end surface 7b of the second inner portion 7A and the second boundary light source 10 facing the second incident surface 10L can be used as the light source for the second outer surface 7A1 of the second inner portion 7A in a second exemplary variation shown in FIG. 6. When the boundary 1B is long in a longitudinal direction thereof, each of the boundary light source 8 and the second boundary light source 10 can illuminate the boundary 1B with a high light-emitting efficiency and a high uniformity.

Figure 7:
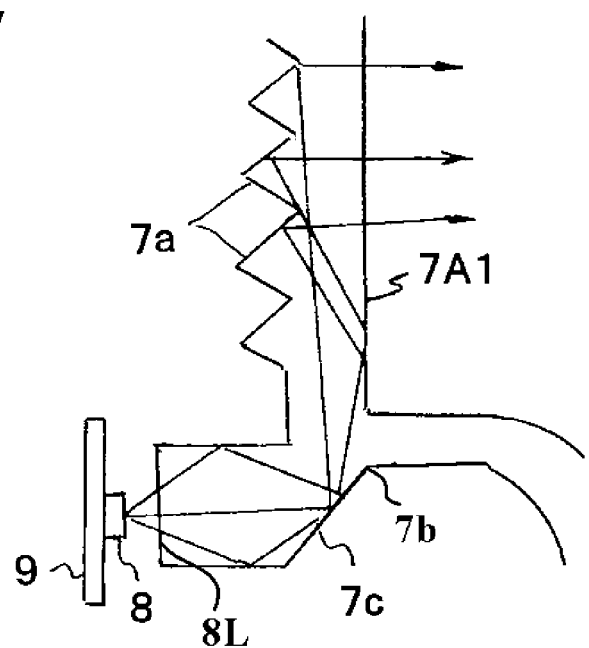
FIG. 7 is a partial cross-sectional side view taken along Line B-B shown in FIG. 1 showing a third exemplary variation of the vehicle signal lamp of FIG. 1.

In a third exemplary variation shown in FIG. 7, the boundary light source 8 can be located toward the second casing 5 with respect to the second outer surface 7A1 of the second inner portion 7A by providing a first incident surface 8L connecting to the second inner end surface 7b of the second inner portion 7A. In this case, the light emitted from the boundary light source 8 can also illuminate the boundary 1B with a high light-emitting efficiency via the second outer surface 7A1 of the second inner portion 7A by providing a reflecting surface 7c between the first incident surface 8L and the second inner end surface 7b.

Figure 8:
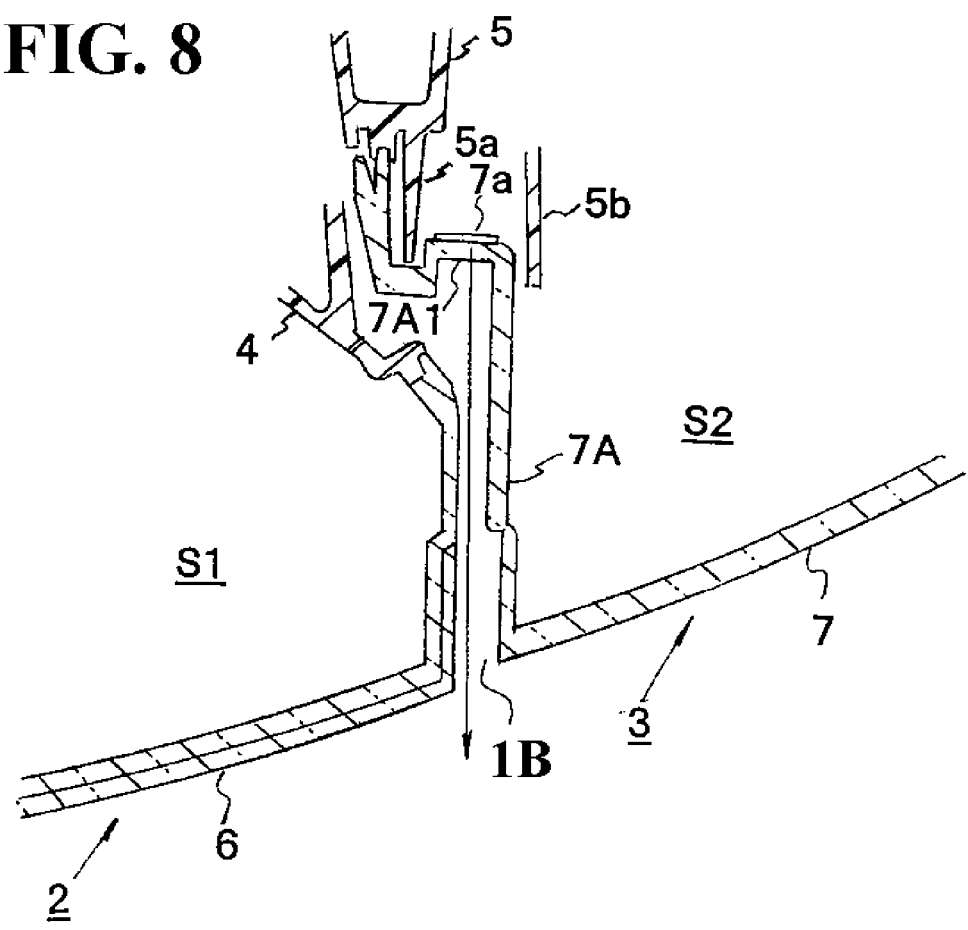
FIG. 8 is a partial cross-sectional top view taken along Line A-A shown in FIG. 1 showing a fourth exemplary variation of the vehicle signal lamp of FIG. 1.
Figure 9A:
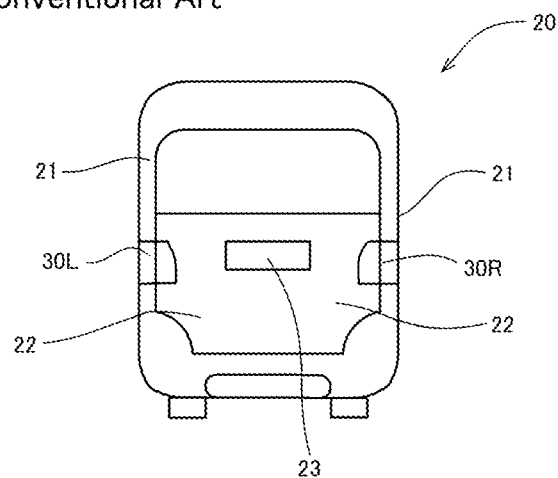
FIG. 9a is a schematic rear view depicting a vehicle incorporating a first conventional rear signal lamp.
Figure 9B:
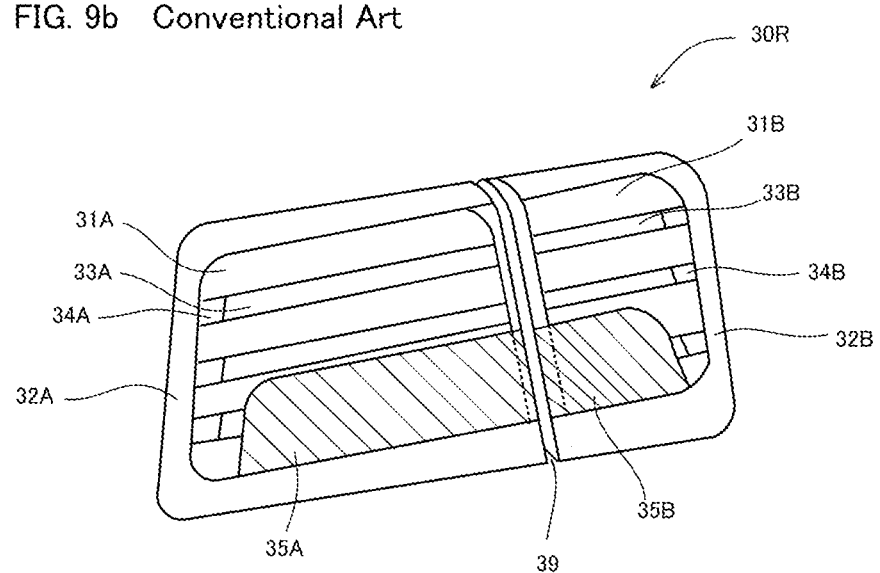
Figure 10A:
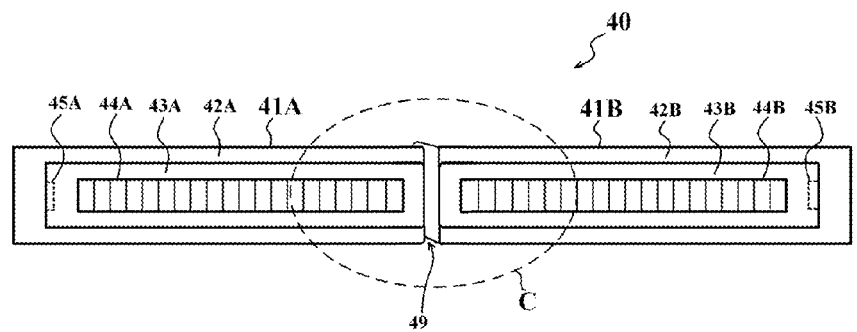
FIG. 10a is a schematic front view depicting a second conventional rear signal lamp.
Figure 10B:
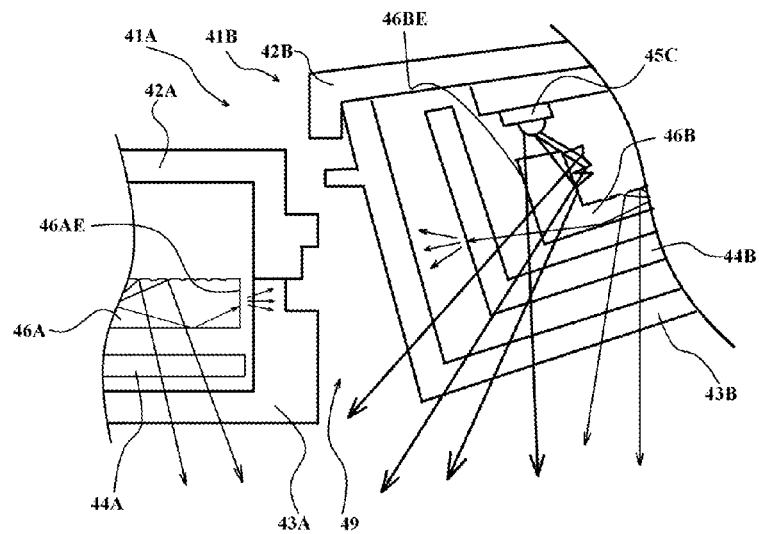
FIG. 10b is a schematic partial cross-sectional top view of Circle C shown in FIG. 10a depicting the second conventional rear signal lamp.

FIG. 8 is a cross-sectional side view taken along Line A-A shown in FIG. 1 showing a fourth exemplary variation of the vehicle signal lamp 1. The fourth variation of the vehicle signal lamp 1 relates to additions of a first shade 5a and a second shade 5b in the vehicle signal lamp 1. Each of the first shade 5a and the second shade 5b can be attached to the second casing 5 so as to surround at least one of the boundary light source 8 and the second boundary light source 10, which are respectively located at a respective one of end portions of the second outer surface 7A1 of the second inner portion 7A as being not able to be shown in FIG. 8, and therefore can prevent at least one of the boundary light source 8 and the second boundary light source 10 from leakages of light in directions other than the boundary 1B.

As described above, for example, when the vehicle signal lamp 1 is used for a tail lamp showing a vehicle width indicator at night, each of the first light source S1-1 located in the first lamp room S1, the second light source S2-1 and the boundary light source 8 located in the second lamp room S2 can emit the red lights in the rearward direction of the vehicle incorporating the vehicle signal lamp 1 via the first outer lens 6, the second outer lens 7 and the second outer surface 7A1 of the second inner portion 7A by turning on the tail lamp switch 18S.

Accordingly, the boundary light source 8 can illuminate the boundary 1B located between the first outer lens 6 and the second outer lens 7 in addition to each of the first light source S1-1 located in the first lamp room S1 and the second light source S2-1 located in the second lamp room S2. Therefore, the red lights emitted in the rearward direction of the vehicle incorporating the vehicle signal lamp 1 from the first outer lens 6 and the second outer lens 7 including the second outer surface 7A1 can be observed as one continuous favorable light-emitting pattern by drivers moving from the rearward direction of the vehicle toward the vehicle with confidence.

Furthermore, the above-described embodiments are described as a tail lamp and a stop lamp for a vehicle signal lamp. However, the vehicle signal lamp can incorporate various signal lamps such as a turn signal lamp, a side marker lamp, etc. In addition, it is conceived that each of the different aspects and features of the different embodiments disclosed herein could be used interchangeably in and with the other disclosed embodiments. For example, by separating the lamp room S2 of the second lamp unit 3 into the lamp room 2 and an additional third lamp room, the third lamp room can also be used for the turn signal lamp, which blinks amber light.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle signal lamp comprising:
   a boundary;
   a first lamp unit including a first casing having a first opening, a first outer lens having a first inner portion, and a first lamp room, the first outer lens attached to the first casing and covering the first opening of the first casing, and thereby the first lamp room formed between the first casing and the first outer lens, and the first inner portion of the first outer lens extending in a direction toward the first casing from the first outer lens along the boundary;
   at least one first light source having a first light-emitting direction located in the first lamp room, and the first light-emitting direction of the first light source being directed toward the first outer lens of the first lamp unit;
   a second lamp unit including a second casing having a second opening, a second outer lens having a second inner portion, and a second lamp room, the second outer lens attached to the second casing and covering the second opening of the second casing, and thereby the second lamp room formed between the second casing and the second outer lens, and the second inner portion of the second outer lens extending in a direction toward the second casing from the second outer lens along the boundary, and therefore facing the first inner portion of the first outer lens via the boundary, which is located between the first lamp unit and the second lamp unit, the second inner portion of the second outer lens including a second inner end surface, a second outer surface and a second inner surface located in an opposite direction of the second outer surface, and substantially facing the boundary, the second inner surface of the second inner portion including a plurality of concavo-convex surfaces, which extends in a substantially horizontal direction of the vehicle signal lamp;
   a boundary light source having a boundary light-emitting direction facing the second inner end surface of the second outer lens, and the boundary light-emitting direction of the boundary light source being directed toward the second inner end surface of the second outer lens; and
   at least one second light source having a second light-emitting direction located in the second lamp room, and the second light-emitting direction of the second light source being directed toward the second outer lens of the second lamp unit.

2. The vehicle signal lamp according to claim 1, wherein the at least one first light source is used as a light source for at least one of a tail lamp and a stop lamp.

3. The vehicle signal lamp according to claim 1, wherein the at least one second light source is used as a light source for at least one of a tail lamp and a stop lamp.

4. The vehicle signal lamp according to claim 1, wherein at least one of the at least one first light source, the boundary light source and the at least one second light source is a light-emitting diode.

5. The vehicle signal lamp according to claim 1, further comprising:
   a second incident surface connecting to each of the second outer surface and the second inner surface of the second outer lens located in an opposite direction of the second inner end surface of the second outer lens; and a second boundary light source having a second optical axis facing the second incident surface, and the second optical axis of the second boundary light source intersecting with the incident surface at a substantially right angle.

6. The vehicle signal lamp according to claim 5, wherein an incident angle of the second boundary light source is less than 90 degrees with reference to the second outer surface of the second inner portion.

7. The vehicle signal lamp according to claim 1, further comprising:

a first incident surface connecting to the second inner end surface of the second inner portion, being located toward the second casing, facing the boundary light source, and be directed toward the boundary light-emitting direction of the boundary light source.

8. The vehicle signal lamp according to claim 1, further comprising:

a first shade be attached to the second casing; and a second shade attached to the casing, wherein each of the first shade and the second shade surrounds the boundary light source.

9. The vehicle signal lamp according to claim 7, further comprising:

a first shade be attached to the second casing; and a second shade attached to the casing, wherein each of the first shade and the second shade surrounds at least one of the boundary light source and the second boundary light source.

10. The vehicle signal lamp according to claim 1, further comprising:

at least one of a reflective layer and a refusing layer formed on the plurality of concavo-convex surfaces of the second inner surface.

11. The vehicle signal lamp according to claim 4, wherein the at least one first light source is used as a light source for at least one of a tail lamp and a stop lamp.

12. The vehicle signal lamp according to claim 4, wherein the at least one second light source is used as a light source for at least one of a tail lamp and a stop lamp.

13. The vehicle signal lamp according to claim 5, wherein the at least one first light source is used as a light source for at least one of a tail lamp and a stop lamp.

14. The vehicle signal lamp according to claim 5, wherein the at least one second light source is used as a light source for at least one of a tail lamp and a stop lamp.

15. The vehicle signal lamp according to claim 6, wherein the at least one first light source is used as a light source for at least one of a tail lamp and a stop lamp.

16. The vehicle signal lamp according to claim 6, wherein the at least one second light source is used as a light source for at least one of a tail lamp and a stop lamp.

17. The vehicle signal lamp according to claim 7, wherein the at least one first light source is used as a light source for at least one of a tail lamp and a stop lamp.

18. The vehicle signal lamp according to claim 7, wherein the at least one second light source is used as a light source for at least one of a tail lamp and a stop lamp.

19. The vehicle signal lamp according to claim 8, wherein the at least one first light source is used as a light source for at least one of a tail lamp and a stop lamp.

20. The vehicle signal lamp according to claim 8, wherein the at least one second light source is used as a light source for at least one of a tail lamp and a stop lamp.

* * * * *